April 24, 1934.                R. W. JENKINS                1,956,219
                          CLIP OR FASTENING DEVICE
                            Filed May 7, 1930
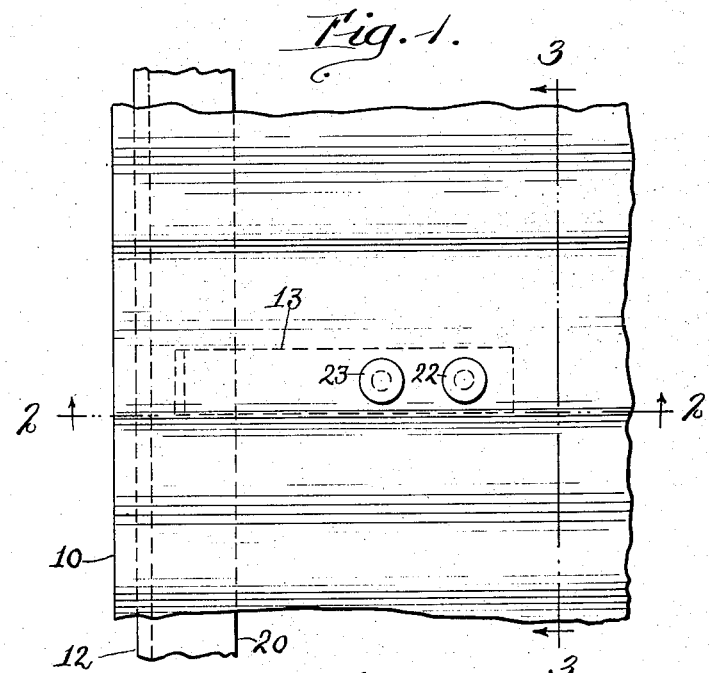
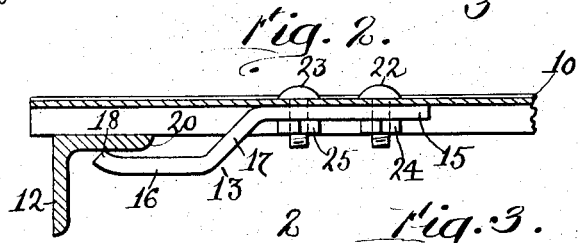
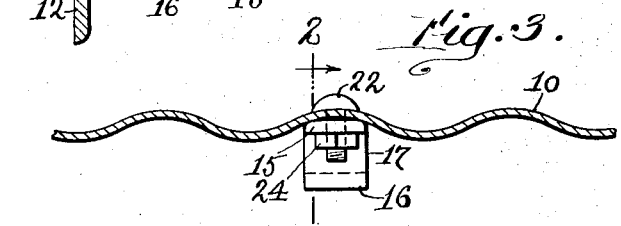
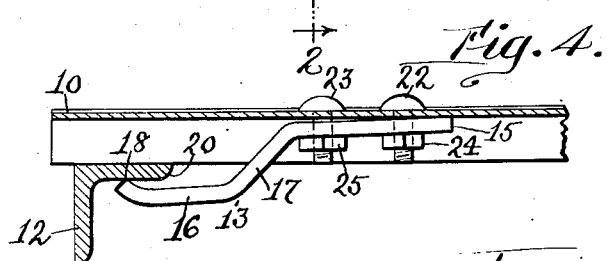
Inventor:
Reginald William Jenkins
by Jas. H. Churchill
                atty.

Patented Apr. 24, 1934

1,956,219

UNITED STATES PATENT OFFICE 1,956,219

CLIP OR FASTENING DEVICE

Reginald William Jenkins, Birkenhead, England, assignor to H. H. Robertson Company, Pittsburgh, Pa., a corporation of Pennsylvania Application May 7, 1930, Serial No. 450,439

2 Claims. (Cl. 189—35)

This invention relates to a clip or fastening device, especially adapted for securing a corrugated metal sheet and particularly a corrugated asphalt-protected metal sheet to a supporting member in building constructions.

The invention has for its object to provide a clip by means of which the corrugated metal sheet may be firmly secured to the supporting member irrespective of variations, within limits, in thickness of the corrugated metal sheet or of the supporting member, which latter is usually a flanged structural steel member, such as a purlin in the roof construction of the building or an angle iron or channel bar in the wall construction of said building.

The invention also has for its object the production of a simple, inexpensive and efficient clip having the functions above noted.

The particular features of the invention will be pointed out in the claims at the end of this specification.

Fig. 1 is a plan view of a portion of a corrugated metal sheet secured to a supporting member by a clip embodying this invention;

Fig. 2, a section on the line 2—2, Fig. 1;

Fig. 3, a section on the line 3—3, Fig. 1, looking toward the left with the supporting member omitted;

Fig. 4, a section like Fig. 2 to illustrate the action of the clip when a variation occurs in the thickness of the metal sheet or in the supporting member.

Referring to the drawing 10 represents a corrugated metal sheet which may be of plain metal, such as aluminum, galvanized iron, or the like, or which may be an asphalt-protected metal, and 12 represents a supporting member of a building to which the corrugated sheet 10 is fastened or secured by a clip 13 embodying this invention.

The clip 13 is preferably made of bar stock, such as bar steel and is provided with a rear portion or member 15, a front portion or member 16 located in a plane substantially parallel with the rear member 15 and connected therewith by an inclined intermediate portion 17.

The front portion or member 16 is provided with an upwardly extended toe portion 18, which is designed to engage the supporting member and which allows the rear member 15 to be firmly secured to the corrugated sheet 10 so as to firmly secure the latter to the supporting member 12 irrespective of variations in the depth of the corrugated sheet or of the thickness of the supporting member.

As represented in the drawing the supporting member 12 is shown as an angle iron or purlin upon which the corrugated metal sheet rests as in the roof construction of a building.

In practice the depth of the corrugations in the same and different sheets vary, and the flange 20 of the supporting member 12 may also vary in thickness and therefore the distance from the under surface of the flange 20 to the under surface of the corrugation with which the clip is engaged, may vary materially, in some instances from ¼" to ⅜".

When the distance between the under surface of the flange 20 and the under surface of the corrugation in the sheet 10 is what may be regarded as normal, the clip 13 is designed to have its rear member 15 substantially parallel with the under surface of the corrugation, when the toe 18 of the front member of the clip is engaged with the under surface of the flange 20 of the purlin 12, as represented in Fig. 2.

The under surface of the rear member of the clip is made substantially flat or straight and under the normal conditions referred to, is substantially parallel with portions of the corrugation with which the upper surface of the rear member 15 of the clip is engaged.

When the clip is made of substantially flat bar steel as herein represented, the rear member 15 thereof for substantially its entire length is engaged with the corrugation of the sheet 10 and is firmly secured thereto by two bolts 22, 23 and nuts 24, 25, as represented in Fig. 2.

When, however, the distance between the underside of the flange 20 of the purlin and the under surface of the corrugation varies and is greater than the normal distance, as represented in Fig. 4, then the clip is capable of being moved about the toe 18 as a pivot and its rear member 15 is raised upwardly until the outer end thereof is engaged with the corrugated sheet, after the manner represented in Fig. 4.

In such cases, the rear member 15 for a portion of its length is engaged with the corrugated sheet and is firmly held by the outer bolt 22 and nut 24, and the front end portion of the rear member 15 is slightly separated from the corrugated sheet, but is nevertheless held firmly by the second bolt 23 and nut 25 in addition to the bolt 22 and nut 24.

The rear member 15 of the clip may be shaped on its upper surface to conform more or less to the shape of the corrugation in the metal sheet, as represented in Fig. 3 and its under surface is made substantially straight to provide a substantially flat surface with which the nuts 24, 25 may contact substantially over their entire area, as represented in Figs. 2, 3 and 4. The rear member 15 is provided with suitable holes through which the bolts 22, 23 may extend, said holes being spaced apart and arranged lengthwise of the member 15.

The clip 13 may be made as a casting or as herein represented may be made of bar stock, such as steel, which is preferred as a clip of maximum strength may be produced at a minimum cost.

It will be observed that the front portion or member 16 is substantially parallel with the rear portion or member 15 and that the upper surface of the front member 16 is, under normal conditions represented in Fig. 2, a substantial distance below the under surface of the flange 20 when the toe 18 is engaged with the latter, which allows the clip to be inclined after the manner represented in Fig. 4, when the distance between the under surface of the flange 20 and the under surface of the corrugation is greater than the normal distance due to an increase in the depth of the corrugation or in the thickness of the flange 20.

The clip 13 has been described as used with the corrugated sheet and the supporting member as forming a part of the roof construction of a building but it is equally well adapted for use with the corrugated sheet and supporting member when the latter form part of a side wall of the building, as will appear by viewing the drawing at right angles to the length thereof.

One construction of clip embodying the invention is herein shown, but it is not desired to limit the invention to the particular construction shown.

What is claimed is:

1. The combination with a supporting member having a substantially straight under surface, and a corrugated sheet engaged with the upper surface of said supporting member, of a clip for securing said corrugated sheet in fixed relation to said supporting member, said clip having a rear member for engaging the corrugated sheet, a front member substantially parallel with said rear member, an inclined member connecting said front and rear members, and a toe on said front member extended above the upper surface of the front member and forming at its upper end a pivot point above the upper surface of the front member to enable the front member to be moved toward and away from the supporting member and compensate for variations in the distance between the under surface of the supporting member and the under surface of the corrugated sheet.

2. A clip of the character described, comprising a rear member, a front member substantially parallel with said rear member, and an intermediate inclined member connecting said front and rear members and of substantial length to position the front and rear members in substantially parallel planes separated by a substantial distance, said front member having its free end inclined upwardly to form a pointed toe having a substantial knife edge pivot about which the clip may be moved.

REGINALD WILLIAM JENKINS.